US008789851B2

(12) United States Patent
Alvarado et al.

(10) Patent No.: US 8,789,851 B2
(45) Date of Patent: Jul. 29, 2014

(54) SEATBELT TO PRETENSIONER CONNECTOR ASSEMBLY

(71) Applicant: TK Holdings, Inc., Auburn Hills, MI (US)

(72) Inventors: Joel David Alvarado, Nuevo Leon (MX); Nancy Abigail Perez, Nuevo Leon (MX)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/655,282

(22) Filed: Oct. 18, 2012

(65) Prior Publication Data
US 2013/0099471 A1 Apr. 25, 2013

Related U.S. Application Data

(60) Provisional application No. 61/550,204, filed on Oct. 21, 2011.

(51) Int. Cl.
B60R 22/18 (2006.01)
A44C 5/20 (2006.01)
B60R 22/195 (2006.01)

(52) U.S. Cl.
CPC .............. A44C 5/2061 (2013.01); B60R 22/18 (2013.01); B60R 22/1952 (2013.01); B60R 22/1955 (2013.01); B60R 2022/1806 (2013.01)
USPC .............................. 280/806; 297/480; 24/663

(58) Field of Classification Search
CPC ............. B60R 228/18; B60R 22/1952; B60R 22/1955; B60R 2022/1806; A44B 17/0011; A44B 17/0017; A44C 5/2057; A44C 5/2061

USPC ............. 280/801.2, 806; 297/480; 24/580.11, 24/659, 663
See application file for complete search history.

(56) References Cited

U.S. PATENT DOCUMENTS

| | | | | |
|---|---|---|---|---|
| 3,286,316 A | * | 11/1966 | Marosy | 24/574.1 |
| 3,406,433 A | * | 10/1968 | Frey | 24/647 |
| 4,486,918 A | * | 12/1984 | Peebles | 16/422 |
| 6,238,003 B1 | | 5/2001 | Miller, III et al. | |
| 6,871,877 B2 | * | 3/2005 | Herrmann et al. | 280/805 |
| 6,883,211 B2 | * | 4/2005 | Hoshino | 24/663 |
| 7,338,083 B2 | | 3/2008 | Sakata | |
| 7,788,774 B1 | * | 9/2010 | Cravey | 24/587.11 |
| 7,862,081 B2 | | 1/2011 | Thomas | |
| 8,496,269 B2 | * | 7/2013 | Holbein et al. | 280/806 |

* cited by examiner

Primary Examiner — Drew Brown
(74) Attorney, Agent, or Firm — Foley & Lardner LLP

(57) ABSTRACT

A seat belt system comprising a webbing configured to restrain an occupant, a pretensioner coupled to the webbing and configured to apply a tensile force to the webbing when a dynamic vehicle event is detected, and a connector assembly for connecting the webbing to the pretensioner. The connector assembly includes a first coupling member having a first end and a second end connected to the webbing, and a second coupling member having a first end and a second end connected to the pretensioner. The first end of the second coupling member is configured to be detachably coupled to the first end of the first coupling member. The first end of the first coupling member includes a cavity configured to receive the first end of the second coupling member, and the relative positions of the first and second coupling members are fixed when the first end of the second coupling member is inserted into the cavity and rotated relative to the first coupling member into a locked position.

18 Claims, 15 Drawing Sheets

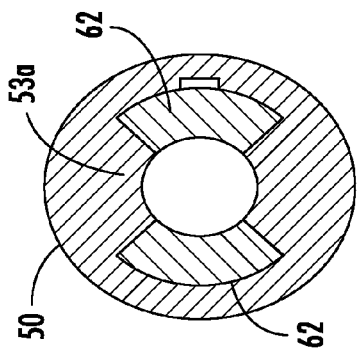
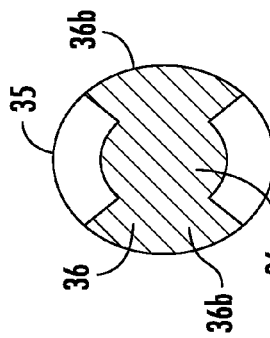
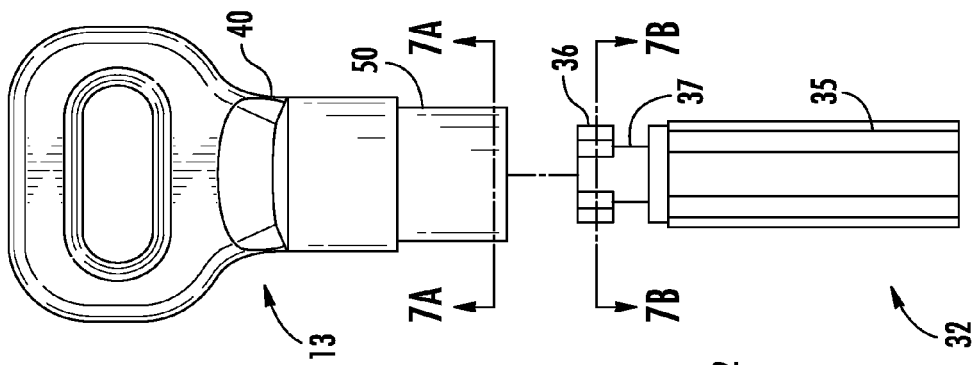
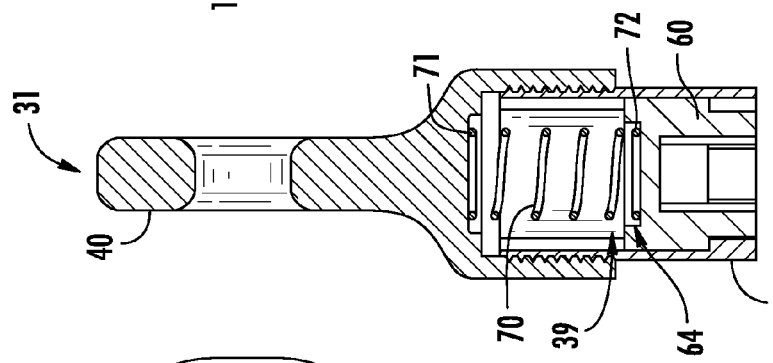
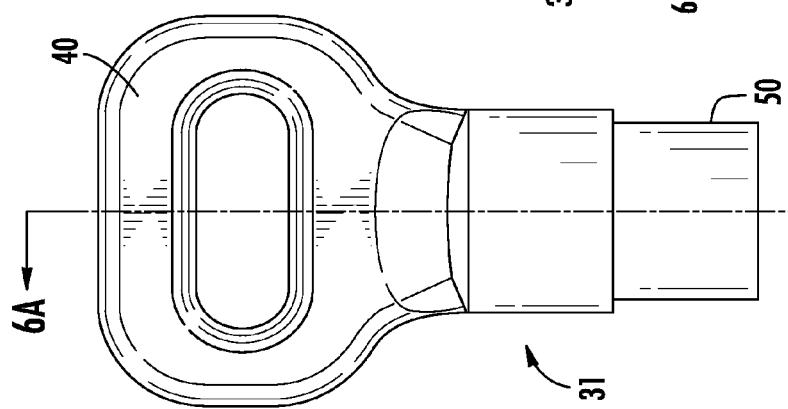

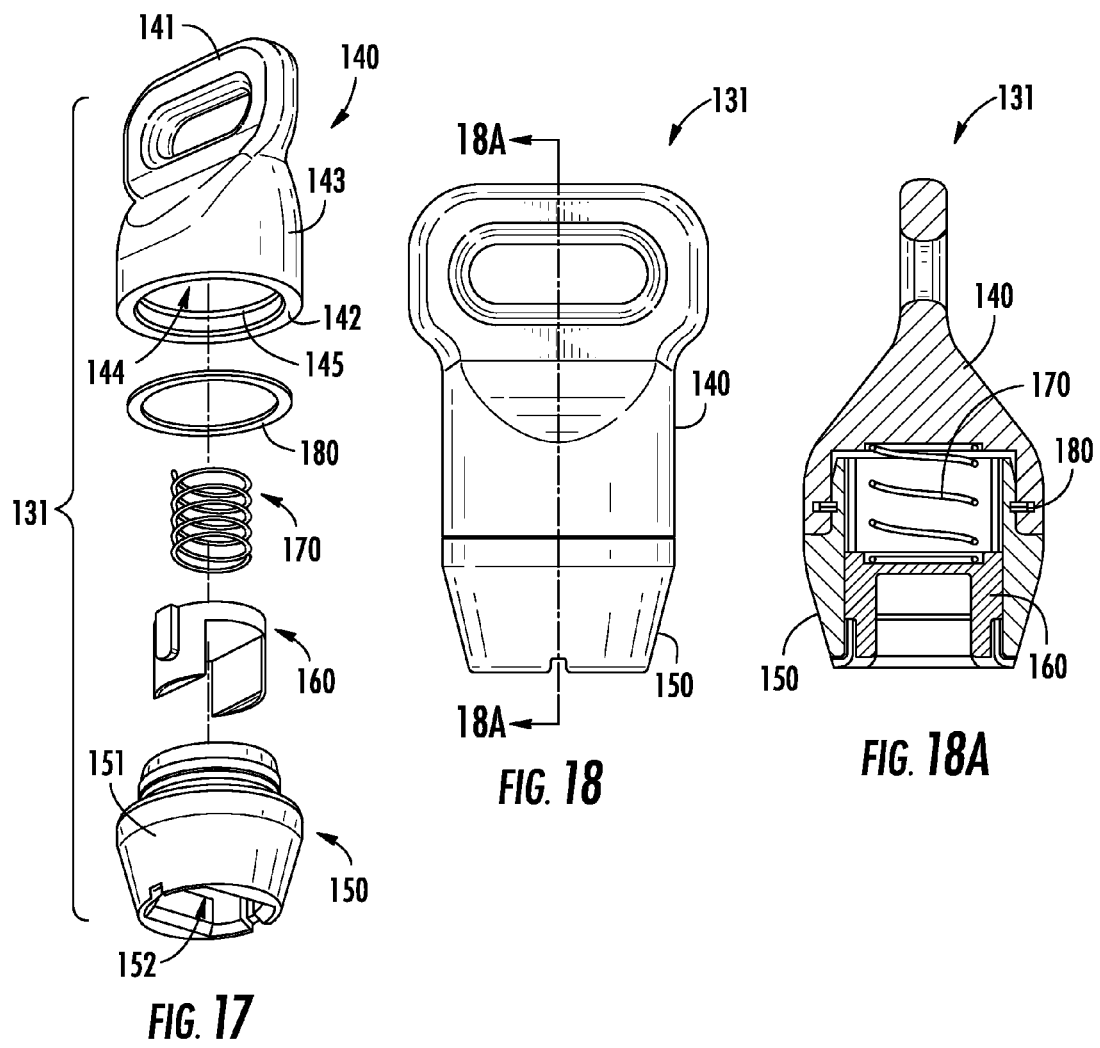

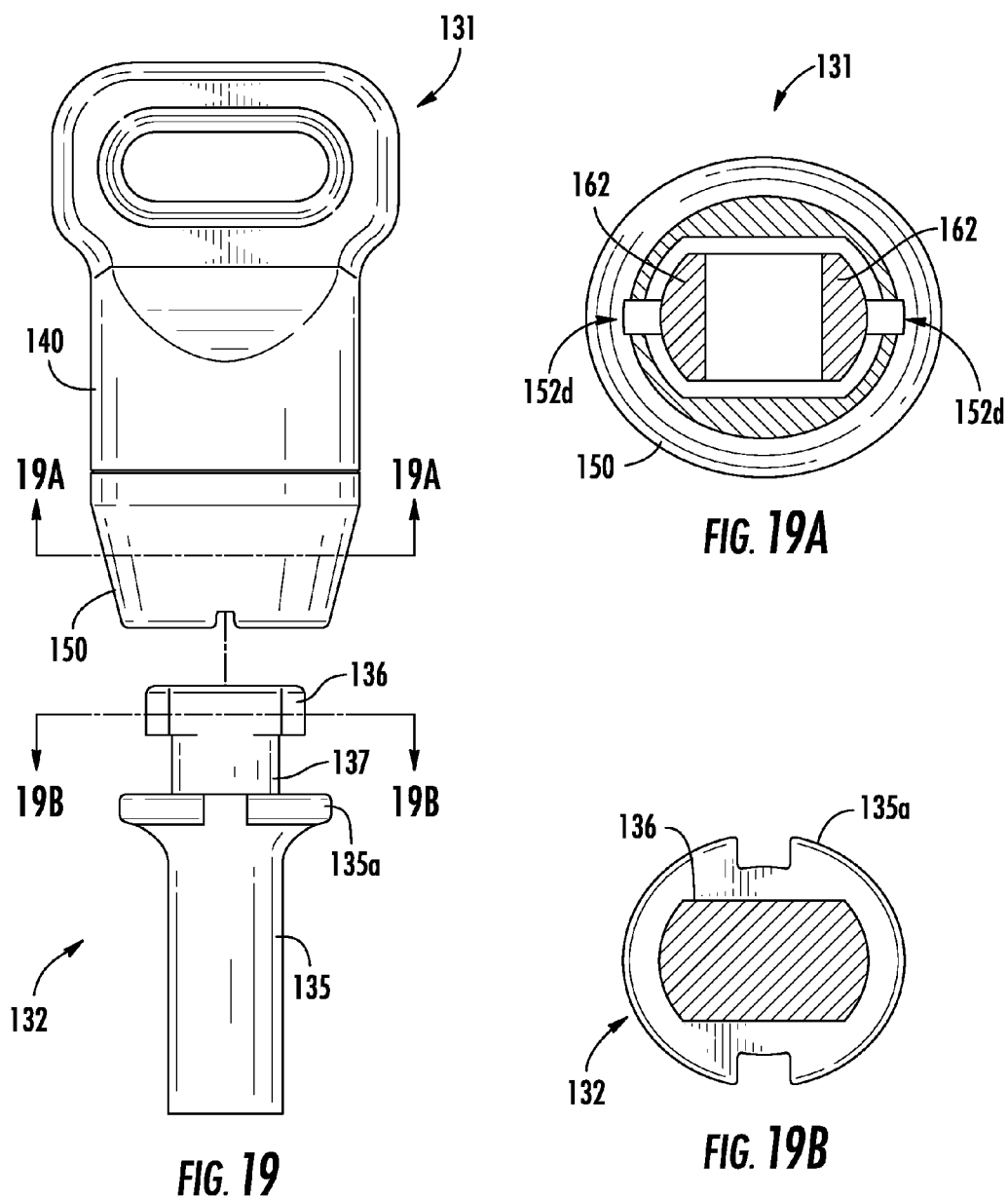

SEATBELT TO PRETENSIONER CONNECTOR ASSEMBLY

CROSS-REFERENCE TO RELATED PATENT APPLICATIONS

This application claims the benefit of and priority to U.S. Provisional Patent Application No. 61/550,204, which was filed on Oct. 21, 2011. U.S. Provisional Patent Application No. 61/550,204 is incorporated by reference herein in its entirety.

BACKGROUND

The present application relates generally to the field of occupant restraint systems for use in moving vehicles. More specifically, the present application relates to a connector assembly of an occupant restraint system for coupling the seatbelt to a pretensioning device.

SUMMARY

One embodiment relates to a seat belt system for protecting an occupant of a vehicle. The seat belt system comprises a webbing configured to restrain an occupant, a pretensioner coupled to the webbing and configured to apply a tensile force to the webbing when a dynamic vehicle event is detected, and a connector assembly for connecting the webbing to the pretensioner. The connector assembly includes a first coupling member having a first end and a second end connected to the webbing, and a second coupling member having a first end and a second end connected to the pretensioner. The first end of the second coupling member is configured to be detachably coupled to the first end of the first coupling member. The first end of the first coupling member includes a cavity configured to receive the first end of the second coupling member, and the relative positions of the first and second coupling members are fixed when the first end of the second coupling member is inserted into the cavity and rotated relative to the first coupling member into a locked position.

Another embodiment relates to a connector assembly for connecting a pretensioner to a seat belt. The connector assembly comprises a first coupling member and a second coupling member. The first coupling member has a cavity, an opening to provide access to the cavity, and a lug. The second coupling member has an end configured to selectively engage the cavity through the opening to detachably connect the first and second coupling members. The lug engages the end of the second coupling member to fix the relative positions of the first and second coupling members when the first end of the second coupling member is inserted into the cavity and rotated relative to the first coupling member into a locked position.

Yet another embodiment relates to an occupant restraint system for securing an occupant of a vehicle. The occupant restraint system comprises a seat belt configured to restrain the occupant, a pretensioner configured to apply a force to the seat belt, and a connector assembly configured to detachably connect the pretensioner to the seat belt. The connector assembly comprises a first coupling member and a second coupling member. The first coupling member has a cavity and an opening to provide access to the cavity, where the opening has a different cross-sectional shape than the cavity. The second coupling member has an end configured to selectively engage the cavity through the opening to detachably connect the first and second coupling members. One of the first and second coupling members is coupled to the seat belt and the other of the first and second coupling members is coupled to the pretension. The relative positions of the first and second coupling members are fixed when the end of the second coupling member is inserted into the cavity and rotated relative to the first coupling member into a locked position.

BRIEF DESCRIPTION OF THE DRAWINGS

FIG. 6 is a side view of the connector assembly of FIG. 5 shown coupled.

FIG. 6A is a cross-sectional view of the connector assembly of FIG. 6.

FIG. 7 is a side view of the connector assembly of FIG. 5 shown uncoupled.

FIG. 7A is a cross-sectional view of the connector assembly of FIG. 7.

FIG. 7B is another cross-sectional view of the connector assembly of FIG. 7.

FIG. 17 is an exploded perspective view of the connector assembly of FIG. 15.

FIG. 18 is a side view of the connector assembly of FIG. 17 shown coupled.

FIG. 18A is a cross-sectional view of the connector assembly of FIG. 18.

FIG. 19 is a side view of the connector assembly of FIG. 17 shown uncoupled.

FIG. 19A is a cross-sectional view of the connector assembly of FIG. 19.

FIG. 19B is a cross-sectional view of the connector assembly of FIG. 19.

DETAILED DESCRIPTION

Disclosed herein are seatbelt to pretensioner connector assemblies that include detachable twist-style (e.g., rotational) connection methods that are durable (e.g., shockproof), improve assembly, reduce cost and complexity, and reduce the packaging size (e.g., volume) required to house the connector assemblies. The connector assemblies are configured to detachably couple a portion of the seat belt webbing, such as the anchor of the lap portion of the webbing, to a pretensioner.

Figure 1:
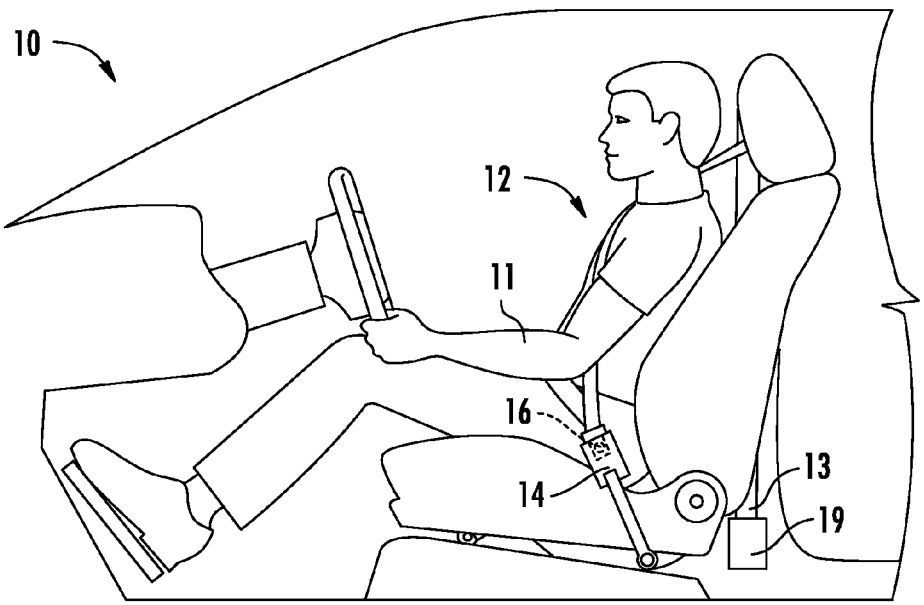
FIG. 1 is a left-side view of a vehicle compartment with an occupant secured to a seat assembly by a seat belt system with a pretensioner.
Figure 2:
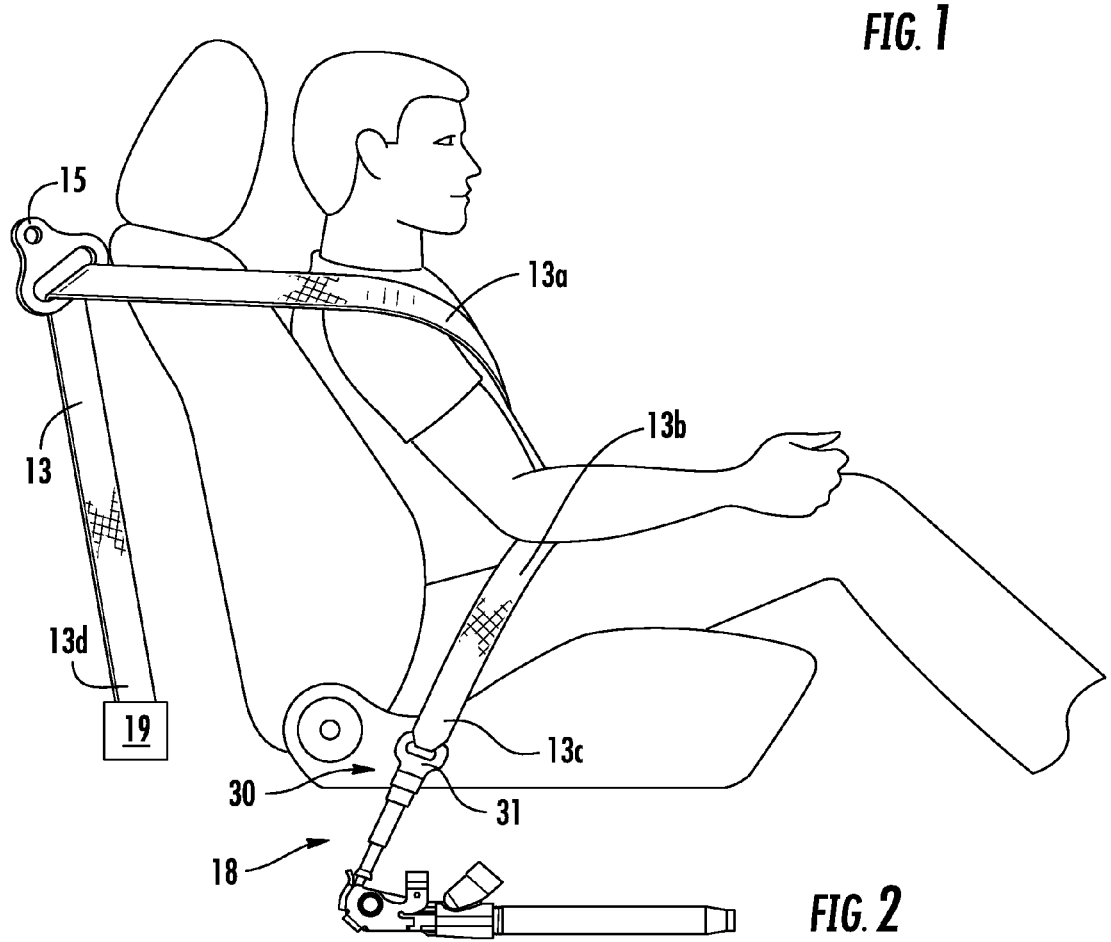
FIG. 2 is another right-side view of the vehicle compartment of FIG. 1.

FIGS. 1 and 2 illustrate an exemplary embodiment of a vehicle 10 having an interior compartment that is configured to provide seating to an occupant 11. The vehicle 10 includes a seat belt assembly 12 that is configured to secure (e.g., restrain) the occupant 11 when seated in a seat assembly of the vehicle 10.

As shown, the seat belt assembly 12 (e.g., seat belt system, occupant restraint device, etc.) includes a seat belt 13 (e.g., a webbing) having a shoulder portion 13a and a lap portion 13b that are separated by a tongue member 16 that is configured to selectively (e.g., releasably) engage a buckle mechanism 14. The lap portion 13b of the seat belt 13 is configured to generally wrap around the lap of the occupant 11 to restrain the lower portion of the occupant 11 during a dynamic vehicle event. The lap portion 13b may have an end 13c disposed opposite the tongue member 16 that is configured to be fixed, such as, for example, to a first coupling member 31 in the form of an anchor (e.g., a mounting member, etc.) of a pretensioning device 18 (e.g., a pretensioner). The shoulder portion 13a of the seat belt 13 is configured to generally wrap around the torso and shoulder of the occupant to restrain the torso or thorax of the occupant during a dynamic vehicle event. The shoulder portion 13a may have an end 13d disposed opposite the tongue member 16 that is configured to be secured, such as, for example, retractably secured to a retractor 19 where the seat belt 13 is configured to wind (e.g., retract) and unwind (e.g., extract) about the refractor 19. The retractor 19 may be integrated with the seat or attached to the vehicle 10. The seat belt assembly 12 may also include a D-ring 15 (e.g., a shoulder anchor, etc.), such as when the retractor 19 is attached to the vehicle, to guide the shoulder portion 13a of the seat belt 13. It is noted that the seat belt assembly 12 may have any suitable configuration and may include fewer or additional components to restrain a secured occupant in a vehicle, and the example disclosed herein is not limiting.

The pretensioner 18 is configured to pretension the seat belt 13, such as during a dynamic vehicle event (e.g., a frontal impact), by removing an amount of slack between the seat belt 13 and the occupant 11 that is present at the onset of the vehicle event. For example, the pretensioner 18 may displace the first coupling member 31 (e.g., the anchor) in a direction away from the occupant to thereby displace the end 13c of the seat belt 13 that is connected to the first coupling member 31a a corresponding distance to remove slack between the occupant 11 and the seat belt 13. The pretensioner 18 may include a casing 20 that houses a piston (or other suitable device) that is configured to move (e.g., displace) within a chamber of the casing 20. The pretensioner 18 may also include a cable 22 (or other suitable device) that is coupled to the piston, such that movement of the piston moves (e.g., pulls) the cable 22 to thereby move (e.g., displace) the end 13c of the seat belt 13.

Figure 3:
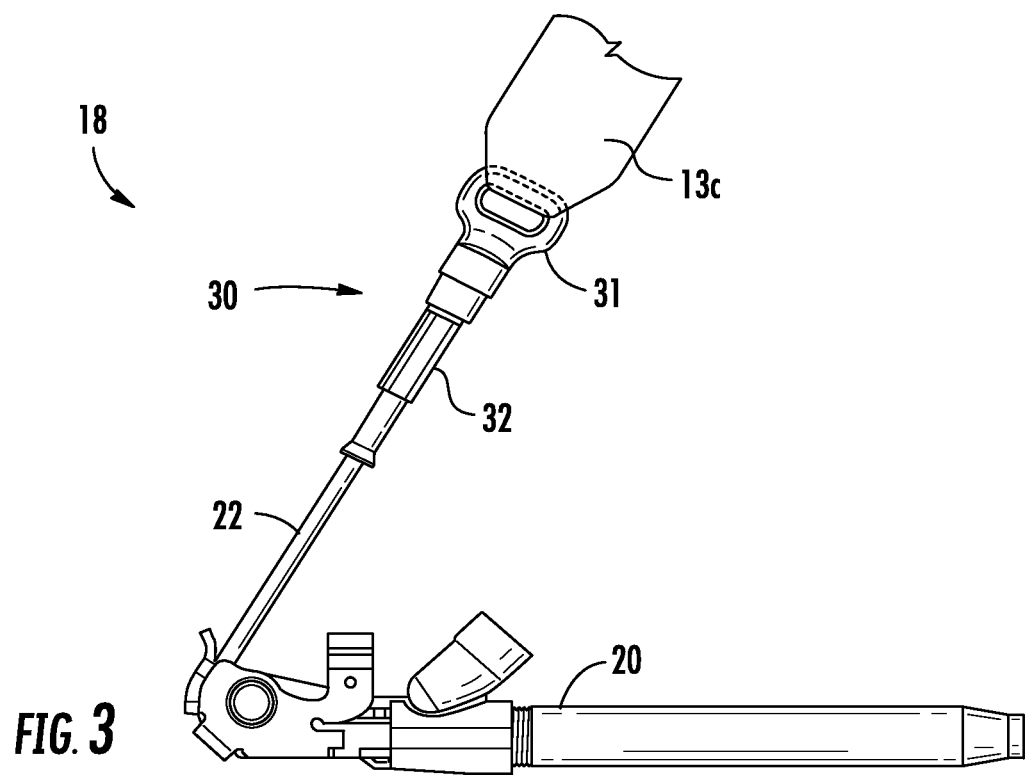
FIG. 3 is a side view of an exemplary embodiment of a connector assembly for coupling a seatbelt to a pretensioning device.
Figure 4:
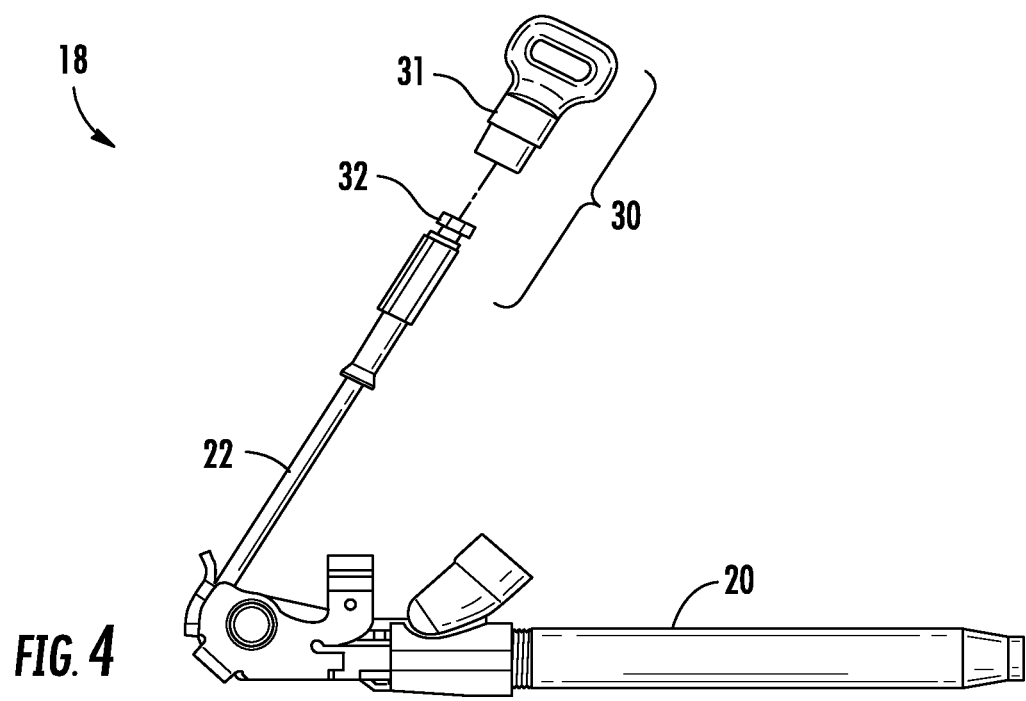
FIG. 4 is a side view of the connector assembly of FIG. 3 with the seatbelt anchor uncoupled from the pretensioning device.

FIGS. 3 and 4 illustrate the pretensioner 18 of the seat belt assembly 12 having an exemplary embodiment of a connector assembly 30 (e.g., a connection assembly, a coupling, etc.) that is configured to detachably connect the seat belt 13 to the pretensioner 18. For example, the end 13c of the lap portion 13b of the seat belt 13 may be coupled to the first coupling member 31, which may be detachably coupled to a ferrule 35 through the connector assembly 30 and the ferrule 35 may be coupled to the pretensioner 18. The connector assemblies as disclosed herein may be used to detachably connect the seat belt to a lap pretensioner, as shown in FIG. 2, or may be used to connect other portions (e.g., shoulder portion) of the seat belt to other types of pretensioners. For example, the connector assembly may connect a buckle mechanism to a pretensioner, where the buckle mechanism is configured to selectively (e.g., detachably) receive and lock a tongue member. The first coupling assembly may be integrated with a buckle mechanism, which may be configured to selectively connect to a tongue member. Accordingly, it is noted that the connector assemblies disclosed herein may be used to connect other portions of the webbing to other suitable pretensioning devices or other devices.

The connector assembly 30 is configured to provide a first connected mode and a second unconnected mode. As shown in FIG. 3, the first coupling member 31 (in the form of an anchor coupled to the end 13c of the lap portion 13b) is connected to the second coupling member 32 (in the form of a ferrule body of the lap pretensioner 18) in the first connected mode. As shown in FIG. 4, the first coupling member 31 is disconnected (e.g., decoupled, etc.) from the second coupling member 32 of the lap pretensioner 18 in the second unconnected mode.

FIGS. 3-14 illustrate an exemplary embodiment of a connector assembly 30 that is configured for use in the pretensioner 18. As shown in FIGS. 5-14, the connector assembly 30 is configured to connect a first coupling member 31 (e.g., first member, first coupling assembly, female coupling, etc.) in the form of an anchor of the lap portion of the seat belt webbing to a second coupling member 32 (e.g., second member, engaging member, second coupling assembly, male coupling, etc.) in the form of a ferrule of the pretensioner. As shown in FIG. 7, the first coupling member 31 (shown as the female coupling assembly) of the connector assembly 30 is configured to selectively engage (e.g., detachably connect) to the second coupling member 32 (shown as the male coupling member). As shown, the second coupling member 32 (e.g., male coupling member) includes a ferrule body 35 and an end 36. The ferrule body 35 is configured to receive and retain a portion of the pretensioner, such as the cable (e.g., wire, cord, etc.), as shown in FIG. 3, that is configured to be moved during pretensioning to in-turn move the connector assembly 30 to pretension the coupled seat belt member (e.g., the anchor of the lap portion of the webbing). For example, the ferrule body 35 may receive and retain a cable that is movably attached to the piston of the pretensioner, such that when the pretensioner is activated, the piston pulls on the cable and coupled ferrule body 35 to pull the first coupling member 31 engaged by the end 36.

The end 36 of the second coupling member 32 has a shape that is configured to be inserted into an opening to engage the first coupling member 31, such as in a cavity 39 of the first coupling member 31. Then upon relative rotation between the second coupling member 32 and the first coupling member 31, the second coupling member 32 is configured to be retained by the first coupling member 31, such that the second coupling member 32 is selectively locked to the first coupling member 31.

Figure 5:
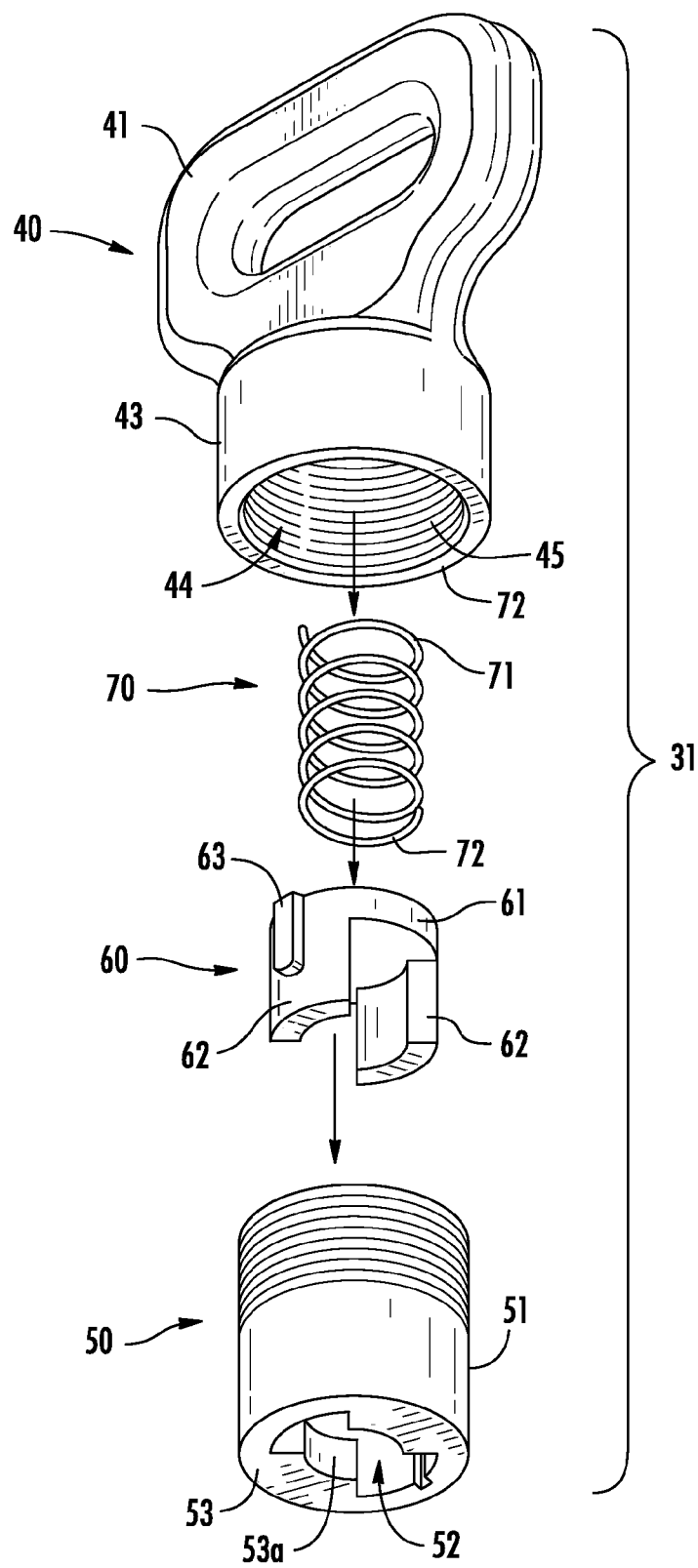
FIG. 5 is an exploded perspective view of the connector assembly of FIG. 3.
Figure 8A:
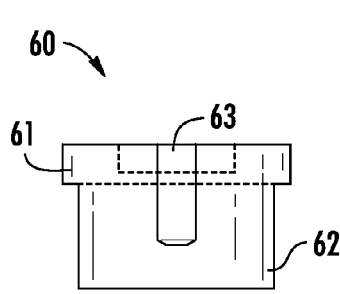
FIG. 8A is a front view of the slider of the connector assembly of FIG. 5.
Figure 8B:
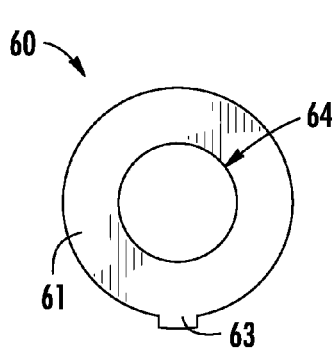
FIG. 8B is a top view of the slider of FIG. 8A.
Figure 8C:
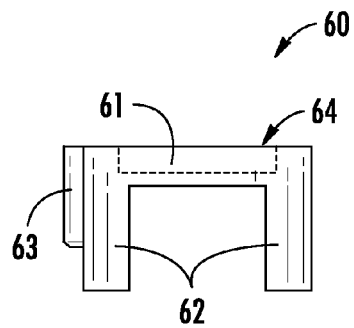
FIG. 8C is a right-side view of the slider of FIG. 8A.

As shown in FIGS. 5, 7, and 7B, the end 36 of the second coupling member 32 includes a key-way shaped extension extending from a shoulder 37 of the body 35, such that the shoulder 37 includes undercut sections (e.g., voids, notches, etc.) disposed between the extension and the body 35. The key-way shaped extension is configured to engage a similar shaped opening 52 in a sleeve 50 of the first coupling assembly 31, in order to allow the end 36 to be inserted into the opening 52. As shown, the male key-way shape of the end 36 includes a circular shaped section 36*a* with two opposing semi-annular extensions 36*b* (e.g., lugs) that extend from the circular section 36*a*, such as in opposing directions. Alternatively, the key-way shape of the end 36 may include a circular section with one extension or more than two extensions, which may extend at any direction.

Alternatively, the key-way shape of the end of the second coupling member may have another suitable shape. According to another exemplary embodiment shown in FIGS. 19-19B, the end 136 has a key-way that is double-D shaped (e.g., generally rectangular with two opposing ends being curved, such as radii). The double-D shaped end 136 is configured to be inserted into a mating double-D shaped opening in the sleeve 150. Also, for example, the end of the second coupling member may have a key-way that is generally rectangular shaped, star-shaped, or formed having other suitable shapes.

Figure 12:
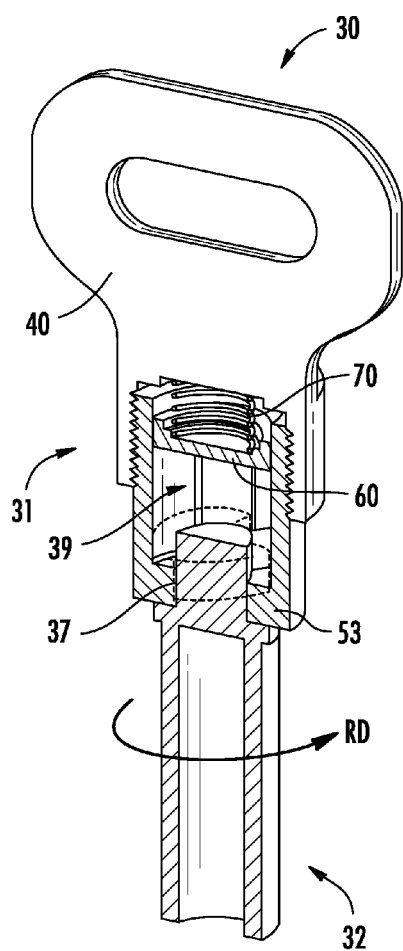
Figure 13:
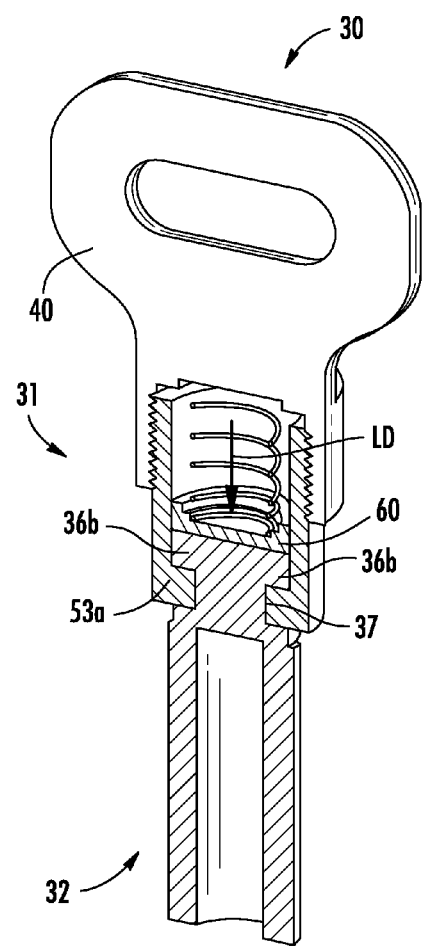

The undercut shoulder 37 of the second coupling member 32 is configured to receive a portion of the first coupling assembly 31 upon relative rotation between the second coupling member 32 and the first coupling assembly 31 to selectively lock the end 36 of the second coupling member 32. As shown in FIGS. 12 and 13, the undercut shoulder 37 is configured to receive a portion in the form of a lug 53*a* (e.g., an extension) of an end wall 53 of the sleeve 50 (of the first coupling assembly 31) when the second coupling member 32 is rotated relative to the first coupling assembly 31 to prevent the second coupling member 32 from becoming disengaged (e.g., decoupled) from the first coupling assembly 31. As discussed below, the connector assembly 30 may also include a locking member (e.g., a movable member, a slider, etc.) that is configured to engage and lock the second coupling member 32 to maintain (e.g., lock) the connection between the first and second coupling members.

The first coupling assembly 31 may include a hub (e.g., cap, etc.), a sleeve configured to couple to the hub to form a cavity therebetween, and a movable member disposed in the cavity and movable between a first (e.g., locking) position and a second (e.g., unlocking) position. As shown in FIGS. 5-6A, the first coupling assembly 31 includes a hub in the form of a ring member 40 (e.g., ring coupling), a biasing member 70 (e.g., spring), a movable member 60 in the form of a sliding member (e.g., slider), and a sleeve 50 (e.g., bearing sleeve). According to an exemplary embodiment, the sleeve 50 is configured to be coupled to the ring member 40 to form a cavity 39 for the movable member 60 to move (e.g., slide) therein. According to another exemplary embodiment, the sleeve 50 and the ring member 40 are integrally formed as a one-piece (e.g., unitary) first coupling member 31 having an opening that provides access to the cavity 39. The one-piece first coupling member 31 may have a movable member 60 configured to move within the cavity 39, such as in a longitudinal direction.

As shown in FIG. 5, the ring member 40 includes a first end 41 configured to couple to the seat belt and a second end 42 shaped as a ferrule body 43 that is open on an end wall. The body 43 includes a bore 44 in the second end 42 that at least partially defines the cavity 39 (as shown in FIG. 6A) with the sleeve 50, such as to house (e.g., receive) the biasing member 70 and the movable member 60 therein. For example, the body 43 may be generally annular in shape having a generally cylindrically shaped bore 44 extending into the body 43. The body 43 may be configured to be coupled to the sleeve 50 to connect the two members together. For example, the inside (e.g., an internal surface) of the body 43 may include threads 45 configured to engage mating threads 56 provided on the outside (e.g., external surface) of the sleeve 50 to thereby couple the ring member 40 to the sleeve 50. Thus, the sleeve 50 and ring member 40 may be operatively coupled together through a threaded connection, or may be coupled through another suitable connection. The coupled ring member 40 and sleeve 50 retain the movable member 60 (and biasing member 70, if provided) in the cavity 39, yet allow for movement of the movable member 60 within the cavity 39. The ring member 40 may also include a ring (e.g., o-ring, D-ring) that extends from the body 43 to form the first end 41, where the ring is configured to couple to a section of the seat belt webbing, as shown in FIG. 3.

As shown in FIGS. 5 and 9A-9C, the sleeve 50 includes a body 51 having a first bore 52 extending from a first end 53 and a second bore 54 extending from a second end 55. The sleeve 50 may be generally cylindrically shaped having a threaded section 56 for operatively coupling the sleeve 50 to the ring member 40. For example, the threads 56 may be provided on the outside (e.g., external surface) of the second end 55 of the body 51, and may be configured to engage the mating threads 45 provided on the inside of the ring member 40, such as when the second end 55 of the sleeve 50 is inserted (e.g., screwed) into the bore 44 of the body 43 of the ring member 40 to thereby couple the ring member 40 and sleeve 50 and form the cavity 39.

Figure 9A:
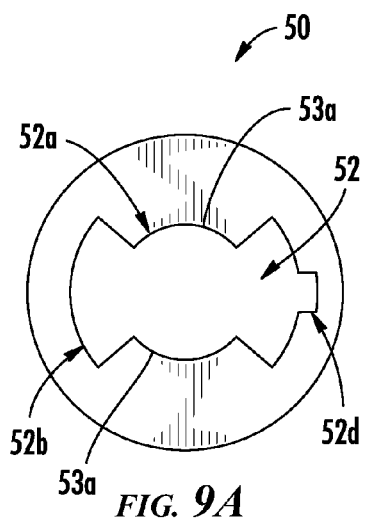
FIG. 9A is a front view of the bearing sleeve of the connector assembly of FIG. 5.
Figure 9B:
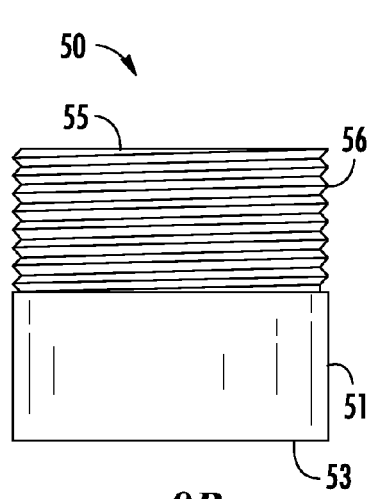
FIG. 9B is a top view of the bearing sleeve of FIG. 9A.
Figure 9C:
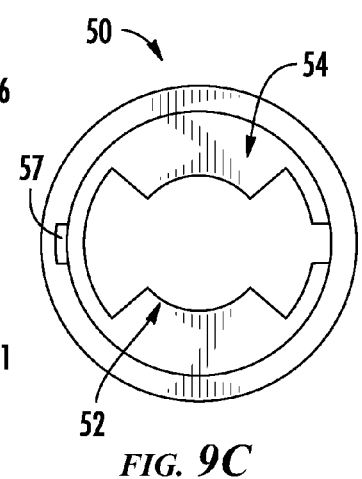
FIG. 9C is a right-side view of the bearing sleeve of FIG. 9A.

As shown in FIGS. 9A-9C, the second bore 54 of the sleeve 50 has a generally circular cross-section and extends a depth or length that allows for the biasing member 70 and the movable member 60 to reside in and move within the second bore 54 and the cavity 39. For example, the second bore 54 may extend in length from the second end 55 to the first bore 52. The length of the second bore 54 may be tailored to tailor the length of the cavity 39 to be substantially the same as the distance of travel of the movable member 60 (e.g., from the locking position to the unlocking position) along with the thickness of the biasing member 70 (e.g., when compressed). The inside surface of the circular second bore 54 may act as a bearing surface to allow for relatively efficient movement of the movable member 60 relative to the sleeve 50.

The first bore 52 of the sleeve 50 may extend from the first end 53 to the second bore 54, and may have a shape that is configured to receive the end 36 of the second coupling member 32. Thus, as shown, the shape of the first bore 52 varies from the shape of the second bore 54, such as to allow the sleeve to receive and retain the end 36 and to retain the movable member 60 in the cavity 39. As shown in FIG. 9A, the shape of the first bore 52 is configured to be complimentary and slightly larger (e.g., mating) relative to the key-way shape of the end 36 of the second coupling member 32. Accordingly, the first bore 52 may have a central circular shaped void 52*a* with two semi-annular voids 52*b* extending outwardly from the circular void 52*a*. As with the key-way of the second coupling member 32, the shape of the first bore 52 of the sleeve 50 may be configured differently and is preferably configured to mate with the end 36 of the second coupling member 32 to allow the end 36 to be inserted into the cavity 39 through the first bore 52 of the sleeve 50 to selectively couple the second coupling member 32 to the first coupling assembly 31 when assembled. The semi-annular voids 52*b* that extend from the central circular void 52*a* may be defined by lugs 53*a* (e.g., tabs, ears, etc.) that are configured to retain the second coupling member 32 once rotated with respect to the first coupling assembly 31 (e.g., the sleeve 50).

It is noted that the although the bores (e.g., the second bore 54, the bore 44, etc.) are described as having a generally cylindrical shape (e.g., with circular cross-sectional shapes), the bores of the first coupling member 31 may be configured to have another shape, which may be tailored to the shape of the movable member 60, if provided. For example, the movable member 60 may be configured having a square or polygonal cross-sectional shape, and the bores of the first coupling member 31 may be configured having a mating cross-sectional shape (or a different cross-sectional shape). The arrangement having mating shapes may advantageously prohibit relative rotation between the first coupling member 31 and the movable member 60. Accordingly, the cavity of the first coupling member may have a shape that is different than a cylindrical shape, such as to accommodate the movable member, and the examples disclosed herein are not limiting.

As shown in FIGS. 5 and 9A, the two opposing lugs 53*a* are configured to retain the extensions 36*b* of the end 36 of the second coupling member 32 (as shown in FIG. 7B) when the end 36 is rotated an angle, such as, for example, rotated approximately 90° (ninety degrees), from the alignment of insertion into the first bore 52. It is noted that the lugs 53*a* as shown will retain the extensions 36*b* even with a very small angle of rotation between the end 36 and the sleeve 50, and the 90° identifies that the lugs 53*a* are rotationally offset from the voids 52*b* by approximately 90°. The angle of offset between the lugs 53*a* and the voids 52*b* may be configured differently, such as for differently configured key-way shapes, and the examples disclosed herein are not limiting.

The first bore 52 of the sleeve 50 may optionally include a groove 52*d* that extends from an annular void 52*b*, where the groove 52*d* is configured to facilitate the release (e.g., decoupling) of the second coupling member 32 from the first coupling member 31. This is discussed in greater detail below.

As shown in FIG. 5, the biasing member 70 is configured as a cylindrically shaped coiled extension spring (e.g., a helical spring) that is configured to bias the movable member 60 in a direction away from the ring member 40 and toward the sleeve 50. The biasing member 70 may be disposed in the cavity 39, such that a first end 71 of the spring may abut an inner surface of the ring member 40 to restrain movement of the first end 71, and a second end 72 of the spring may abut the movable member 60 to restrain movement of the second end 72. For example, a surface of the ring member 40 that defines the bore 44 and cavity 39 may restrain the first end 71 of the biasing member 70.

The biasing member 70 may be configured such that when the first coupling assembly 31 is assembled, the biasing member 70 is compressed between the ring member 40 and the movable member 60 to provide a biasing force on the movable member 60 that acts to move the movable member 60 away from the ring member 40. The biasing force helps retain the selectively coupled second coupling member 32 to the first coupling assembly 31. For example, the biasing force of the biasing member 70 may bias the movable member 60 into the locking position, once the end 36 has been rotated to align the extensions 36*b* of the end 36 with the lugs 53*a* of the sleeve 50. It should be noted that the biasing member may be configured as other types of springs or any suitable member that is able to provide a biasing force between the ring member 40 and the movable member 60.

As shown in FIG. 6A, the movable member 60 is disposed within the cavity 39 of the first coupling assembly 31. The movable member 60 is configured to move between a first (e.g., locking) position and a second (e.g., unlocking) position. For example, the movable member 60 may be configured to slide between the bore 44 of the ring member 40 (e.g., in the unlocking position) and the bores of the sleeve 50 (e.g., in the locking position).

As shown in FIGS. 5 and 8A-8C, the movable member 60 has an end wall 61 (e.g., top wall) with two legs 62 extending away from (e.g., downwardly from) the end wall 61. The end wall 61 may have a generally circular cross-section that is configured to move (e.g., slide) within the cavity 39 (e.g., the second bore 54 of the sleeve 50 and/or the bore 44 of the ring member 40). Each leg 62 may be semi-annular in shape, such as to allow each leg 62 to slide into (and out of) engagement with one of the semi-annular voids 52*b* of the first bore 52 of the sleeve 50 when the second coupling member 32 is selectively coupled to (and decoupled from) the first coupling member 31. For example, each leg 62 may engage a respective void 52*b* when the movable member 60 is in the locking position, and each leg 62 may be disengaged from the respective void 52*b* when the movable member 60 is in the unlocking position to allow the end 36 to engage the voids of the first bore 52.

The movable member 60 may also optionally include one or more than one finger 63 that extends outwardly from a leg 62. As shown, the movable member 60 includes one finger 63 in the form of a projection that extends outwardly from one leg 62. The finger 63 is configured to ride along a groove 57 (e.g., channel) in the sleeve 50, such as where the groove 57 is cut into the inside of the wall of the body 51 of the sleeve 50 that defines the second bore 54, to maintain the alignment (e.g., rotational orientation) between the movable member 60 and the sleeve 50, such as when the legs 62 are out of engagement with the voids 52*b* of the first bore 52 of the sleeve 50. In other words, the finger 63 and groove 57 cooperate to ensure the movable member 60 and the sleeve 50 maintain proper alignment (e.g., rotational alignment). It is noted that the movable member 60 does not require a finger, or may include multiple fingers having other suitable configurations to help maintain the relative orientation between the movable member 60 and the sleeve 50.

The movable member 60 may also optionally include a feature configured to receive and retain the spring. As shown in FIGS. 6A and 8A-8C, the end wall 61 of the movable member 60 includes a bore 64 having a generally circular cross-section, where the bore 64 receives the second end 72 of the biasing member 70 to retain the second end 72 in the bore 64. Thus, the bore 64, if present, may be cylindrically shaped to receive the end of the helical spring therein, or may have an alternative shape that is tailored to the shape of the biasing member.

As shown in FIG. 5, the first coupling assembly 31 is assembled by connecting the sleeve 50 to the ring member 40 through the threaded connection, such that the biasing member 70 and the movable member 60 are disposed in the cavity 39 formed by the bore 44 of the ring member 40 and the second bore 54 of the sleeve 50. The movable member 60 is orientated such that the legs 62 of the movable member 60 are aligned with the voids 52b of the first bore 52 of the sleeve 50. Thus, the movable member 60 is able to move (e.g., slide) within the cavity 39 relative to the ring member 40 and the sleeve 50, such as when the legs 62 of the movable member 60 are displaced (e.g., moved) by the end 36 of the second coupling member 32 when the end 36 is inserted into the first bore 52 of the sleeve 50. The biasing member 70 is configured to bias the movable member 60 in the direction toward the sleeve 50 (i.e., in the biasing direction), such that the biasing force must be overcome by an opposing force in order to move the movable member 60 toward the biasing member 70 and the inside wall of the bore 44 of the ring member 40. Thus, the rate (e.g., spring rate) of the biasing member 70 may be tailored to tailor the threshold force required to selectively couple (e.g., engage) the second coupling member 32 and the first coupling member 31. During assembly of the coupling members, once the biasing force is overcome by an opposing force from the end 36 of the second coupling member 32 being inserted into the first bore 52 of the sleeve 50, the movable member 60 can move to a position to allow the end 36 to be inserted beyond the first bore 52 into the second bore 54. Once the opposing force is reduced below the biasing force, such as when the end 36 is rotated a predetermined amount, the biasing force from the biasing member 70 displaces (e.g., moves) the movable member 60 away from the inside wall of the ring member 40 toward the sleeve 50 such that the legs 62 re-engage the voids 52b of the sleeve 50.

Figure 10:
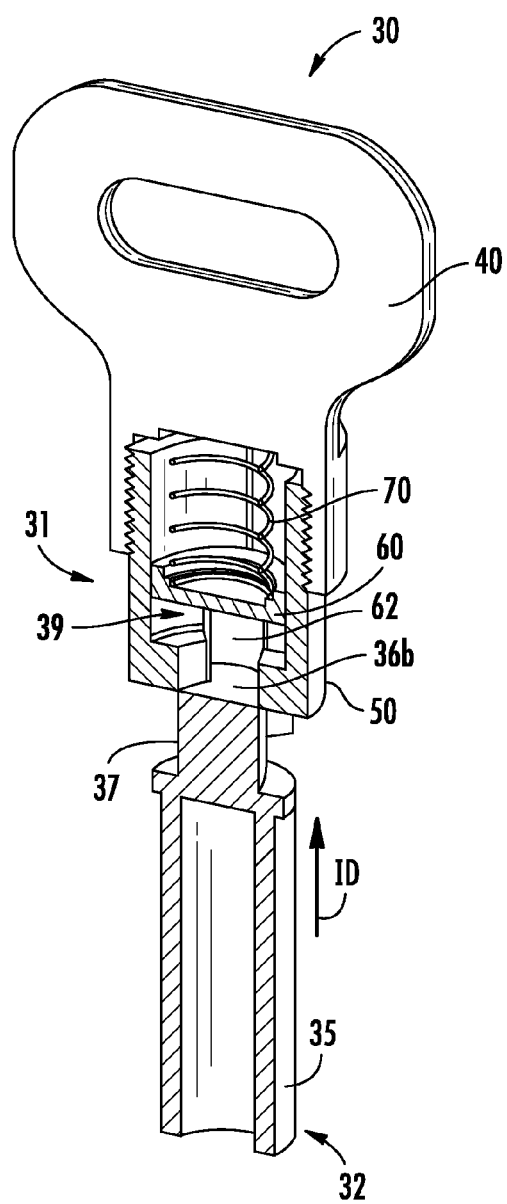
FIGS. 10-13 are perspective cross-sectional views of the connector assembly of FIG. 5 shown in various stages of assembly.
Figure 11:
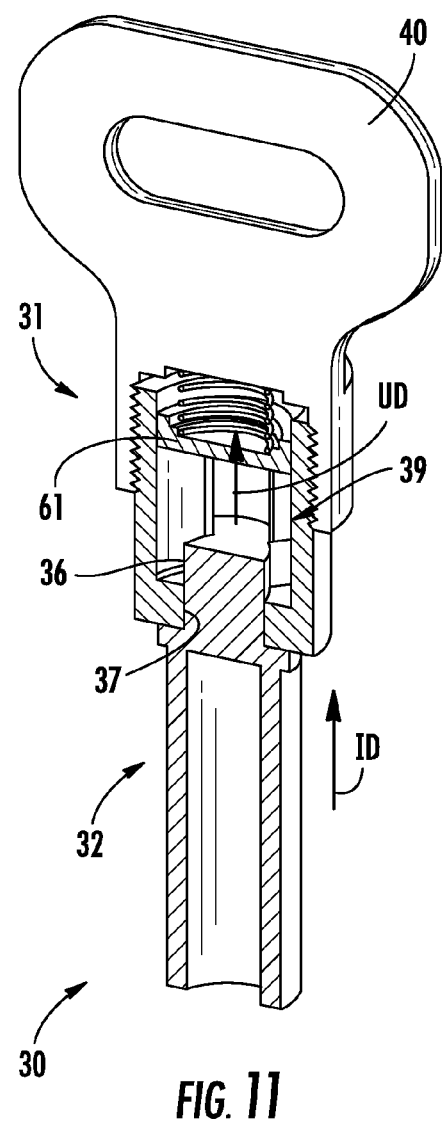

As shown in FIGS. 10-13, the second coupling member 32 is selectively connected (e.g., coupled) to the first coupling assembly 31 using a two step method of assembly. The first step involves inserting the end 36 of the second coupling member 32 having the key-way into the mating key-way shaped opening of the first bore 52 of the sleeve 50 of the first coupling assembly 31. As shown in FIGS. 10 and 11, the arrows ID indicate the insertion direction of the second coupling member 32 relative to the first coupling assembly 31. As the second coupling member 32 is inserted into the first coupling assembly 31 through the first bore 52 of the sleeve 50, the extensions 36b (e.g., semi-annular extensions) on the end 36 of the second coupling member 32 are aligned with the voids 52b (e.g., semi-annular voids) of the first bore 52 and the legs 62 of the movable member 60, and accordingly come into contact with the legs 62 such that as the second coupling member 32 is further inserted into the first coupling assembly 31, the extensions 36b of the end 36 drive (e.g., move) the movable member 60 through its legs 62 in the direction opposing the biasing direction of the biasing member 70 (and thereby compresses the biasing member 70). As shown in FIG. 11, the arrow UD indicates the unlocking direction of the movable member 60. Once the second coupling member 32 has been inserted far enough that the extensions 36b on the end 36 pass beyond the trailing edge (e.g., the plane of intersection between the first bore 52 and the second bore 54 of the sleeve 50) of the lugs 53a, then one of the coupling members (e.g., the second coupling member 32) can be rotated a predetermined angular amount (e.g., ninety degrees). In other words, once the second coupling member 32 is inserted far enough for the extensions 36b of the end 36 to pass from the first bore 52 into the second bore 54 of the sleeve 50, then the first coupling member 31 and the second coupling member 32 may be rotated relative to each other to thereby selectively connect (e.g., lock) the first and second coupling members 31, 32 together.

The second step involves rotating one of the first and second coupling members 31, 32 relative to the other of the first and second coupling members 31, 32 by an angle of rotational travel (e.g., a predetermined angle). As shown in FIG. 12, the arrow RD indicates a rotational direction of the second coupling member 32 relative to the first coupling assembly 31 to couple the coupling members together (although the connector assembly 30 is configured such that rotation in the direction opposing the rotation direction RD also selectively couples the coupling members as well). Relative rotation between the coupling members allows the voids (on the end 36) provided between the extensions 36b of the second coupling member 32 to align with the legs 62 of the movable member 60 (and accordingly also align with the voids 52b of the first bore 52 of the sleeve 50), where the force from the biasing member 70 (e.g., the spring), if provided, biases (e.g., moves) the movable member 60 toward the sleeve 50 into the locking position LD (as shown in FIG. 13). The movable member 60 may move such that the legs 62 of the movable member 60 straddle the end 36 of the second coupling member 32 (as the legs 62 fit into, for example, the semi-annular voids provided between the semi-annular extensions 36b of the end 36) and enter the voids 52b of the first bore 52 of the sleeve 50. Accordingly, the legs 62 of the movable member 60 prohibit rotation of the second coupling member 32 relative to the first coupling assembly 31 (e.g., the sleeve 50 and movable member 60) maintaining the locking relationship between the coupling members. The second coupling member 32 is selectively connected to the first coupling assembly 31 by the movable member 60 with the extensions 36b of the end 36 of the second coupling member 32 being disposed in the second bore 54 of the sleeve 50 and retained by the lugs 53a of the sleeve 50. In other words, the end of the second coupling member 32 is retained in the second bore 54 of the sleeve 50 and prohibited from rotating to an alignment that would allow the second coupling member 32 to decouple from the first coupling member 31 by the legs 62 of the movable member 60.

Figure 15:
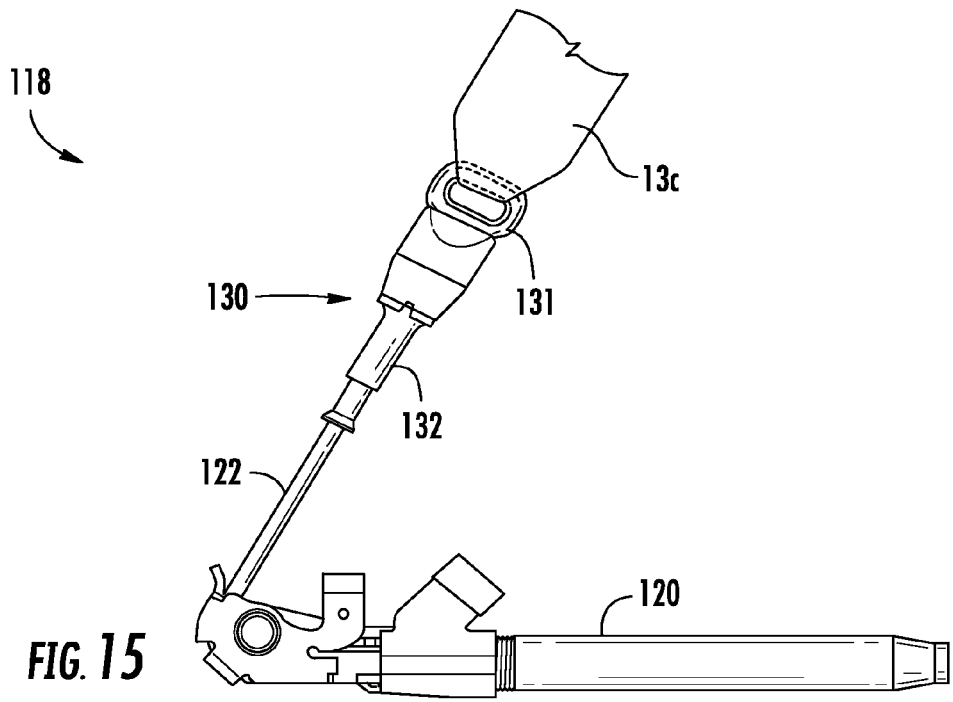
FIG. 15 is a side view of another exemplary embodiment of a connector assembly for coupling a seatbelt to a pretensioning device.
Figure 16:
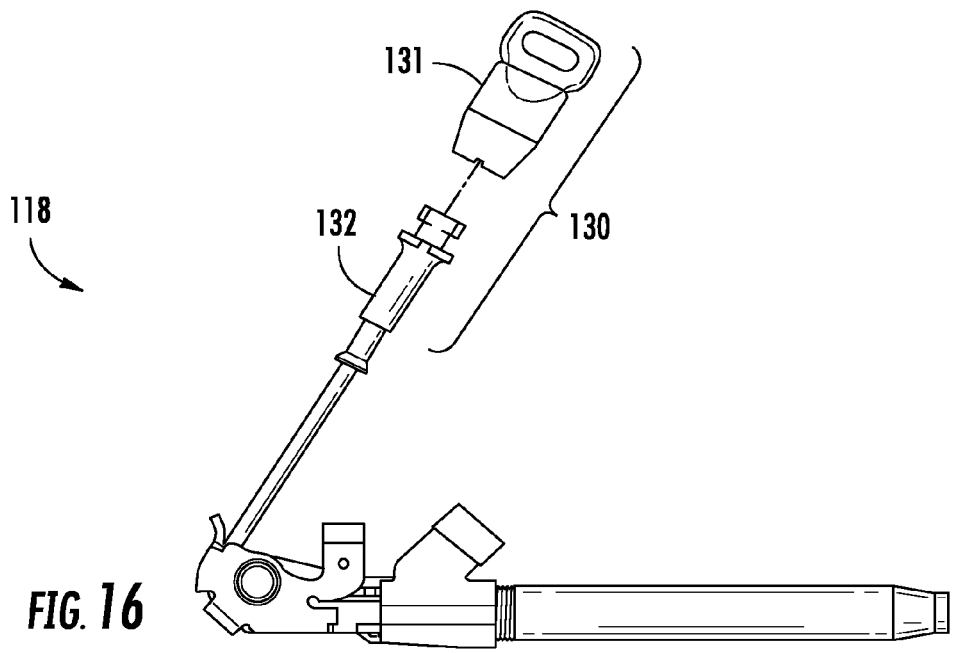
FIG. 16 is a side view of the connector assembly of FIG. 15 with the seatbelt anchor uncoupled from the pretensioning device.

FIGS. 15-27 illustrate another exemplary embodiment of a connector assembly 130 for connecting the seat belt assembly (e.g., the webbing 13c, a buckle, etc.) to a pretensioner 118. The pretensioner 118 may be configured as described above for the pretensioner 18, such that the elements (e.g., the casing 120, the cable 122, etc.) may be configured substantially the same as (or different than) than the elements described above. FIG. 15 illustrates the connector assembly 130 in the coupled (e.g., locked) position, while FIG. 16 illustrates the connector assembly 130 in the decoupled (e.g., unlocked) position. The connector assembly 130 may also be configured as described above for the connector assembly 30 or have different elements and/or features.

As shown, the connector assembly 130 includes a first coupling assembly 131 and a second coupling member 132 configured to detachably connect to the first coupling assembly 131. The first coupling assembly 131 may include, for example, a hub 140, a sleeve 150 configured to be coupled to the hub 140 to define a cavity, and a movable member 160 configured to move within the cavity to allow selective (e.g., detachable) coupling between the first coupling assembly 131 and the second coupling member 132. The connector assembly 130 may also include a biasing member 170 configured to bias the movable member 160 in a direction (e.g., the locking direction). The biasing member 170 may be in the form of a spring.

Figure 27:
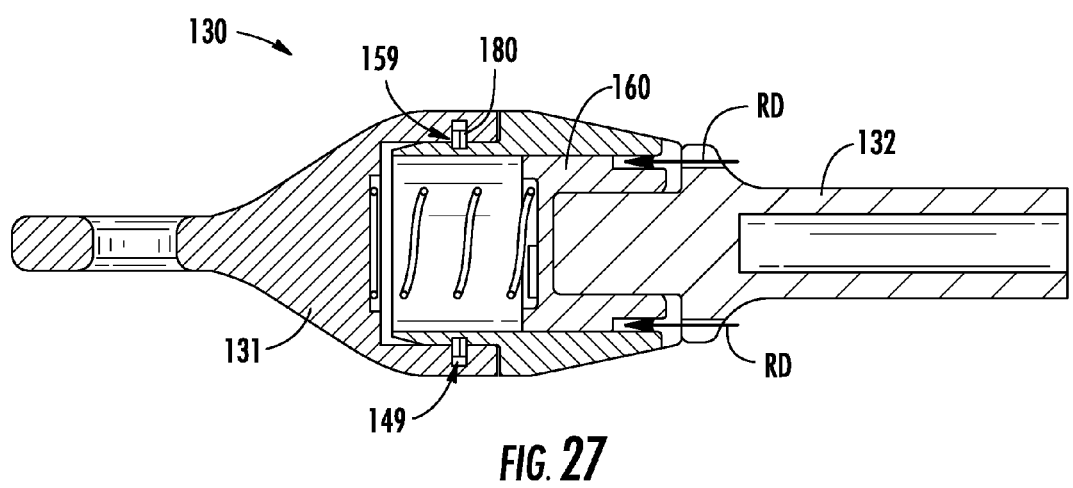
FIG. 27 is a cross-sectional view of the connector assembly of FIG. 26.

The connector assembly 130 may also include a retaining ring 180 (e.g., lock washer) disposed between the hub 140 and the sleeve 150. The retaining ring 180 may connect or help connect the hub 140 and the sleeve 150 in a locking arrangement. As shown, the retaining ring 180 is configured having an annular or ring shape with an outer diameter and an inner diameter. However, the retaining ring 180 may be configured to have a different shape and still help couple the hub 140 and the sleeve 150. As shown in FIG. 27, the hub 140 may include a channel 149 (e.g., notch, recess, etc.), if the retaining ring 180 is provided, which is cut into the inside of a wall 145 that defines a bore 144 (as shown in FIG. 17), where the channel 149 is configured to receive at least a portion of the retaining ring 180. The channel 149 may be configured as a generally rectangular recess formed (or cut) in the wall 145 of the hub 140. Also shown in FIG. 27, the sleeve 150 may include a channel 159 (e.g., notch, recess, etc.), if the retaining ring 180 is provided, which is cut into the outside of a wall 155 that extends from a body 151, where the channel 159 is configured to receive at least a portion of the retaining ring 180. The channel 159 may be configured as a generally rectangular recess formed (or cut) in the wall 155 of the sleeve 150. The wall 155 of the sleeve 150 is configured to engage the bore 144 of the hub 140, such that the wall 155 is adjacent to the wall 145 of the hub 140 and the channel 159 substantially aligns with the channel 149 of the hub 140. Accordingly, before the sleeve 150 is engaged with the hub 140, the retaining ring 180 may be provided either on the sleeve 150 in the channel 159 (or alternatively on the hub 140 in the channel 149), such that sleeve 150 and hub 140 are coupled with the retaining ring 180 disposed in both channels 149, 159. It is noted that the connector assembly 130 may utilize another connection between the hub 140 and the sleeve 150, such as, for example, a threaded connection, or may utilize a combination of connections, such as both a threaded connection and a lock washer connection.

As shown, the hub 140 also includes a first end 141 and a second end 142. The bore 144 may extend inwardly from the second end 142 toward the first end 141. The hub 140 may also include a feature to couple (e.g., connect) a portion of the seat belt assembly (e.g., the webbing) to. As shown, the first end 141 is configured as a ring to retain a portion of the seat belt.

Figure 21A:
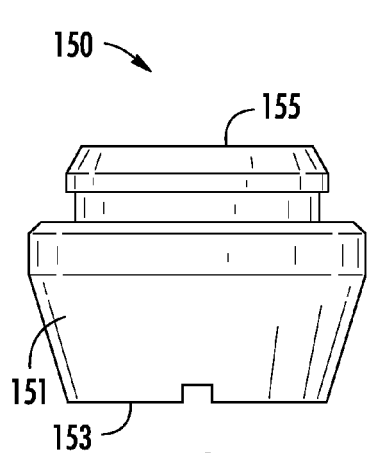
FIG. 21A is a front view of the bearing sleeve of the connector assembly of FIG. 17.
Figure 21B:
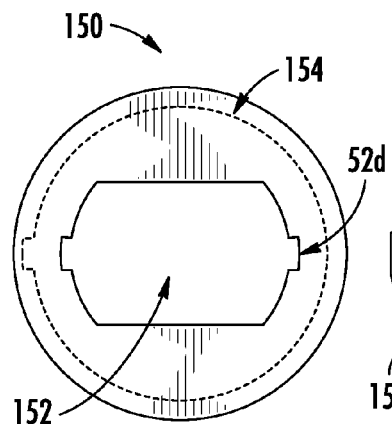
FIG. 21B is a top view of the bearing sleeve of FIG. 21A.
Figure 21C:
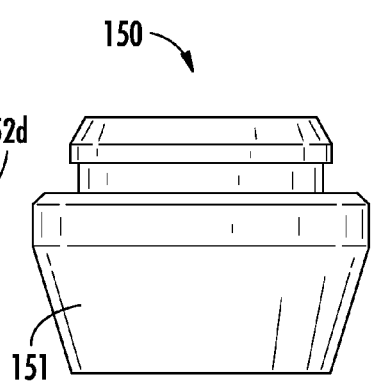
FIG. 21C is a right-side view of the bearing sleeve of FIG. 21A.

As shown in FIGS. 17 and 31A-21C, the sleeve 150 includes a body 151, a wall 155 extending from the body 151, a first bore 152, and a second bore 154. The wall 155 may be configured to couple to the hub 140 directly, indirectly, or a combination thereof. The second bore 154 of the sleeve 150 has a generally circular cross-section and extends a depth or length that allows for the movable member 160 (and biasing member 170, if provided) to reside in and move within the second bore 154 and the cavity.

Figure 26:
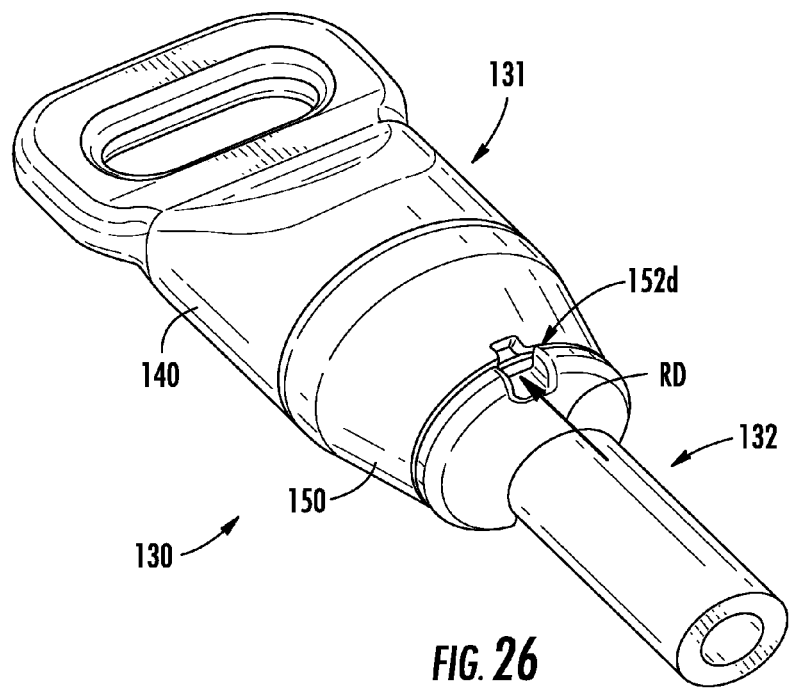
FIG. 26 is a perspective view of the connector assembly of FIG. 17 showing the release mechanism to allow uncoupling of the assembly.

The first bore 152 of the sleeve 150 is configured to receive the end 136 of the second coupling member 132. Thus, the shape of the first bore 152 may tailored to accommodate the shape of the end 136. As shown in FIG. 21B, the first bore 152 has a double-D shape (e.g., generally rectangular with two opposing ends configured as radii). Accordingly, the double-D shaped end 136 may be inserted into a mating double-D shaped opening of the first bore 152 in the sleeve 150. The sections of the bottom wall of the sleeve 150 that are adjacent to the flat portions of the double-D first bore 152 may be used to retain the curved ends of the double-D end 136 upon rotation of one of the coupled first and second coupling members 131, 132. As shown in FIGS. 19A, 26, and 27, the first bore 152 of the sleeve 150 may optionally include a groove 152d that is configured to facilitate the release (e.g., decoupling) of the second coupling member 132 from the first coupling member 131.

Figure 20A:
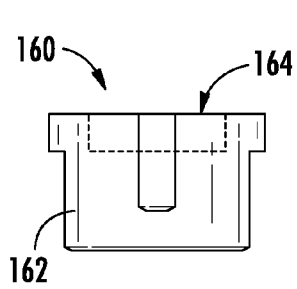
FIG. 20A is a front view of the slider of the connector assembly of FIG. 17.
Figure 20B:
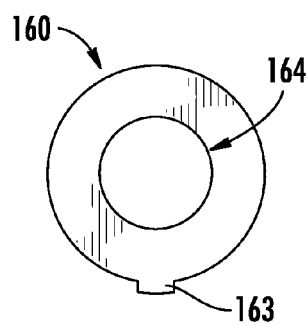
FIG. 20B is a top view of the slider of FIG. 20A.
Figure 20C:
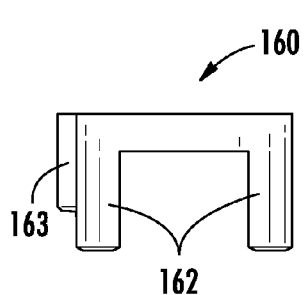
FIG. 20C is a right-side view of the slider of FIG. 20A.

As shown in FIGS. 20A-20C, the movable member 160 includes a base (e.g., top wall) with two spaced-apart legs 162 extending away from (e.g., downwardly from) the base. The base may have a generally circular cross-section that is configured to move (e.g., slide) within the cavity of the first coupling member 131. The base may also include a feature configured to receive and retain the biasing member. For example, the movable member 160 may include a bore 164 having a generally circular cross-section, where the bore 164 receives and retains an end of the biasing member 170. Each leg 162 may be generally D-shaped to allow each leg 162 to slide into (and out of) engagement with the double-D shaped end 136, such that the movable member 160 straddles the end 136 when in the locking position to prohibit rotation of the end 136. The D-shaped legs 162 also may slide into and out of engagement with the first bore 152 of the sleeve 150. For example, the legs 162 may engage the first bore 152 when the movable member 160 is in the locking position, and may be out of engagement with the first bore 152 when the movable member 160 is in the unlocking position. The movable member 160 may also optionally include one or more than one finger 163 that extends outwardly from a leg 162. Each finger 163 is configured to ride along a groove (e.g., channel) in the sleeve 150 to help maintain the relative orientation between the movable member 160 and the sleeve 150.

Figure 23:
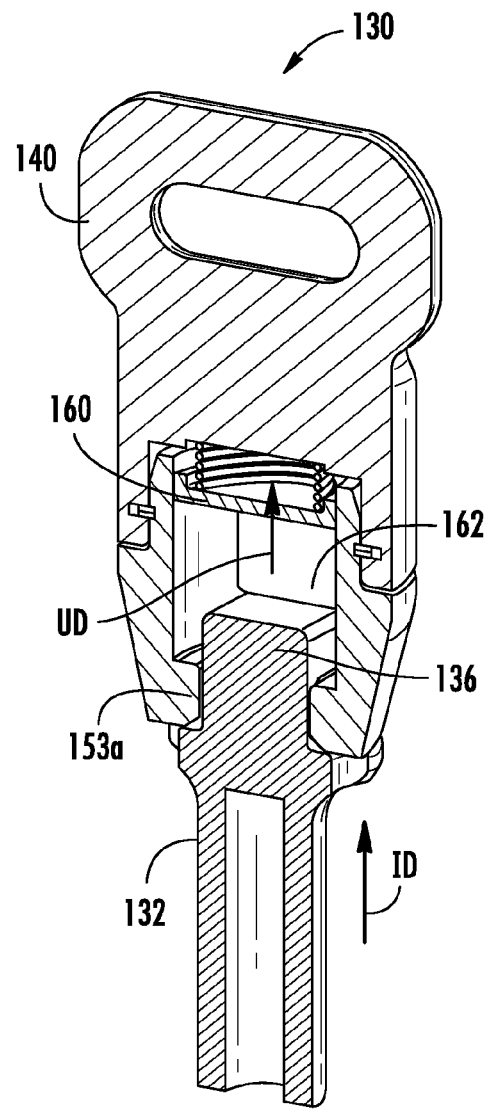
Figure 25:
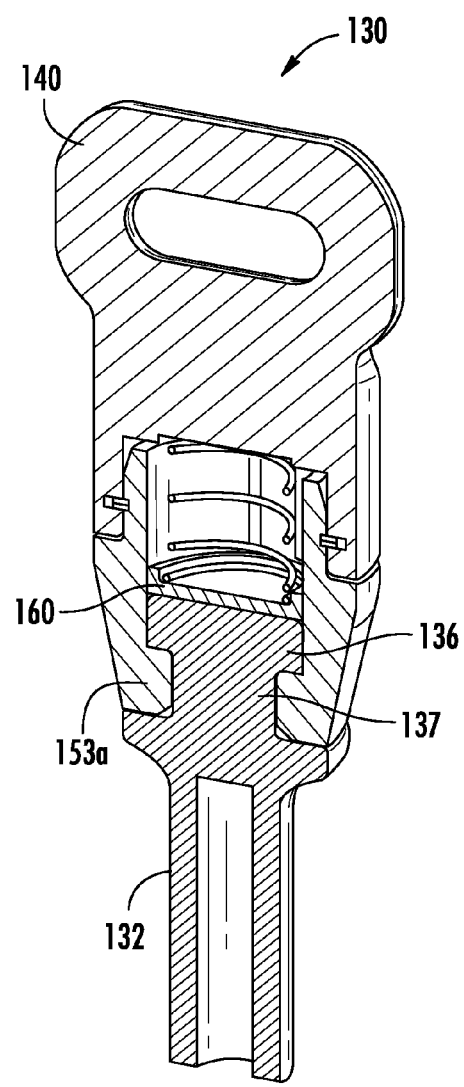

The second coupling member 132 includes a body 135, a shoulder 137 extending from the body 135, and an end 136 extending from the shoulder 137 away from the body 135. The end 136 is configured having a key-way shape to engage the first bore 152 in the sleeve 150. As shown in FIG. 19B, the end 136 has a key-way that is double-D shaped (e.g., generally rectangular with two opposing ends being curved, such as radii) that is configured to be inserted into the mating double-D shaped opening of the first bore 152 in the sleeve 150. The undercut shoulder 137 of the second coupling member 132 is configured to receive a portion of the first coupling assembly 131 upon relative rotation between the second coupling member 132 and the first coupling assembly 131 to selectively lock the end 136 of the second coupling member 132. As shown in FIGS. 23 and 25, the undercut shoulder 137 is configured to receive a lug 153a (e.g., an extension) of the sleeve 150 to securely connect the second coupling member 132 and the first coupling assembly 131.

Figure 22:
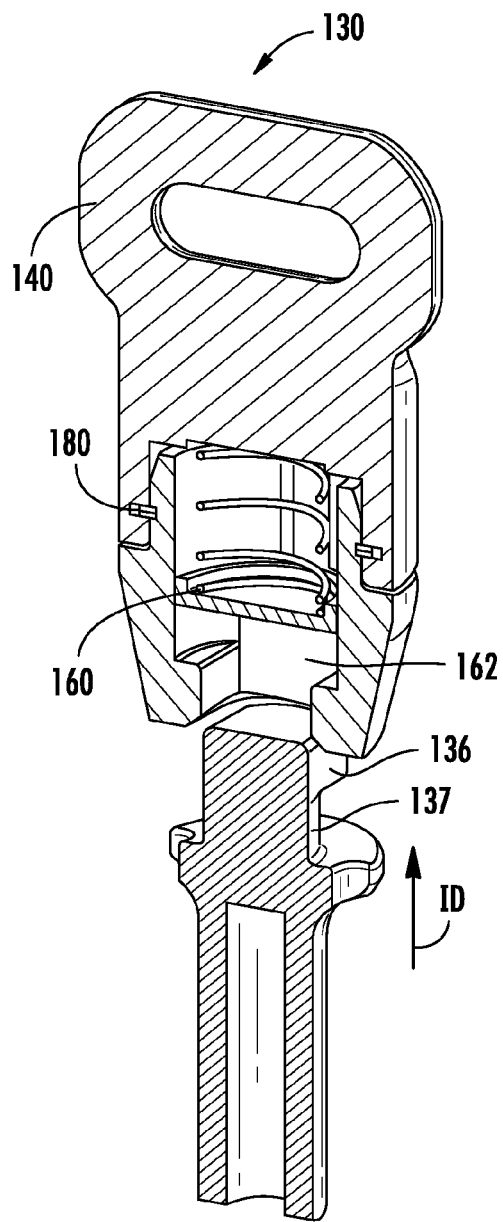
FIGS. 22-25 are perspective cross-sectional views of the connector assembly of FIG. 17 shown in various stages of assembly.
Figure 24:
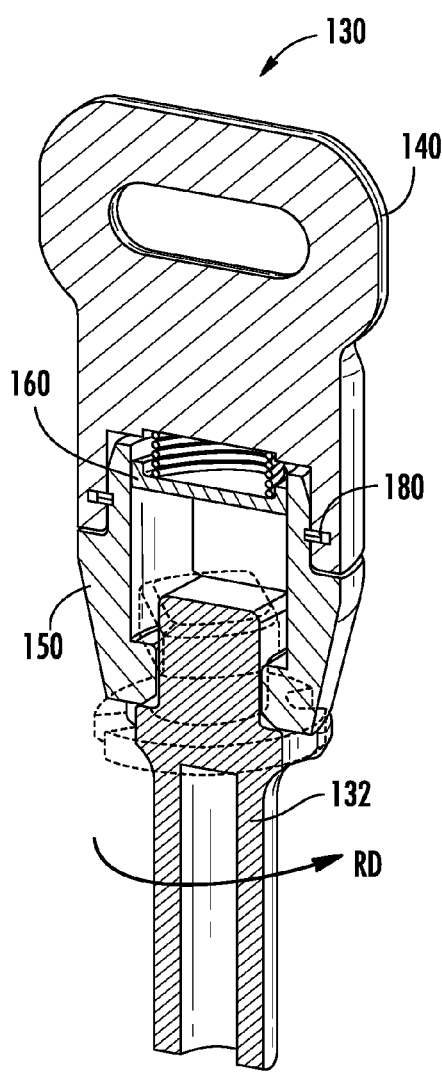

As shown in FIGS. 22-25, the second coupling member 132 is selectively connected (e.g., coupled) to the first coupling assembly 131 using a two step method of assembly, which is similar to the method described above for the connector assembly 30. The first step involves inserting the end 136 of the second coupling member 132 into the first bore 152 of the sleeve 150 of the first coupling assembly 131. As shown in FIGS. 22 and 23, the arrows ID indicate the insertion direction of the second coupling member 132 relative to the first coupling assembly 131. As the second coupling member 132 is inserted into the first bore 152, the end 136 comes into contact with the legs 162 of the movable member 160 such that as the second coupling member 132 is further inserted into the first coupling assembly 131, the end 136 moves the movable member 160 in the unlocking direction UD (as shown by the arrow UD in FIG. 23). Once the second coupling member 132 has been inserted far enough to move from the first bore 152 to the second bore 154 of the sleeve 150, then one of the coupling members (e.g., the second coupling member 132) can be rotated a predetermined angular amount to allow the movable member 160 to move back to the locking position The second step involves rotating one of the first and second coupling members 131, 132 relative to the other of the first and second coupling members 131, 132 by an angle of rotational travel (e.g., a predetermined angle). As shown in FIG. 24, the arrow RD indicates a rotational direction of the second coupling member 132 relative to the first coupling assembly 131 to couple the coupling members together (although the connector assembly 130 is configured such that rotation in the direction opposing the rotation direction RD also selectively couples the coupling members as well). Relative rotation between the coupling members moves the end 136 out of contact with the legs 162 of the movable member 160 to allow the movable member 160 to move from the unlocking position to the locking position. In the locking position, the movable member 160 straddles the end 136 to prohibit relative rotation between the second coupling member 132 and the sleeve 150. Accordingly, the legs 162 of the movable member 160 prohibit rotation of the second coupling member 132 relative to the first coupling assembly 131 to maintain the locking relationship between the coupling members.

Figure 14:
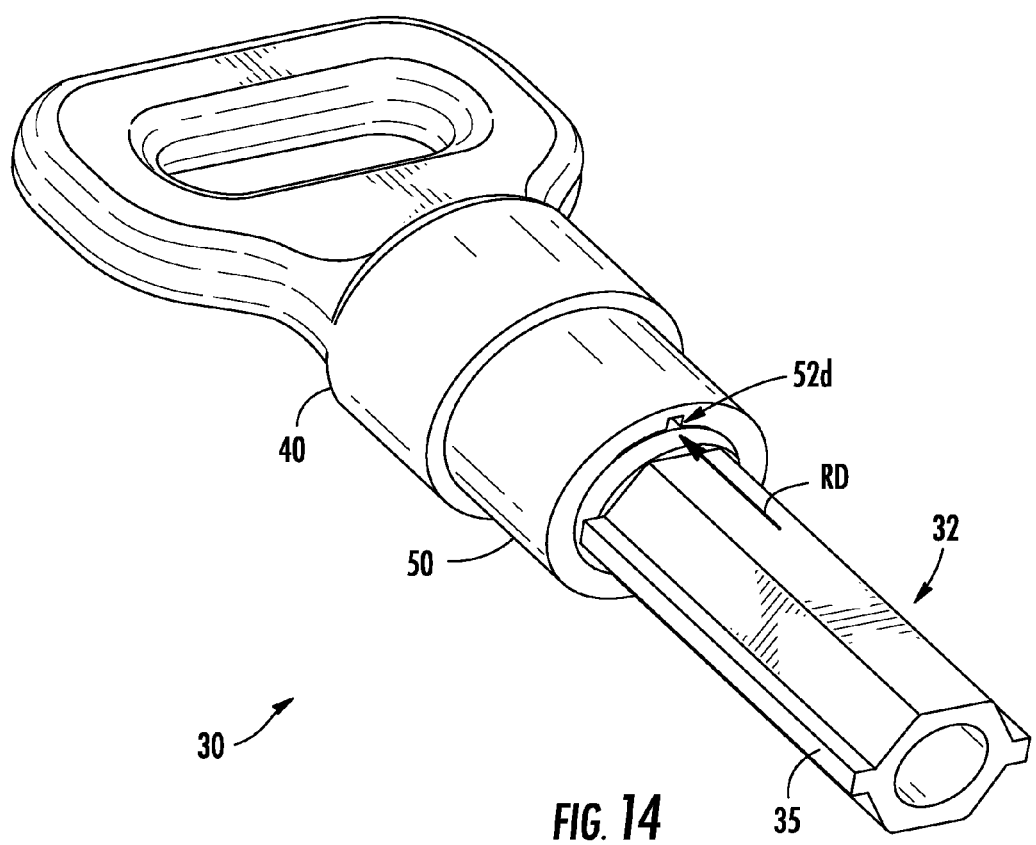
FIG. 14 is a perspective view of the connector assembly of FIG. 5 showing the release mechanism to allow uncoupling of the assembly.

As shown in FIG. 14, the connector assembly 30 includes a release to allow the second coupling member 32 to be decoupled from the first coupling assembly 31. The sleeve 50 may include an opening 52*d* (e.g., hole), which may have a rectangular shape or any suitable shape. For example, the shape of the hole may be configured (e.g., tailored) to receive a specific tool to prohibit unintended decoupling of the connector assembly 30. The opening 52*d* in the sleeve 50 is aligned with a leg 62 of the movable member 60, such that when the tool is inserted into the hole, the tool engages the leg 62 to move the movable member 60 in the unlocking direction UD (as shown in FIG. 11) from the locking position to the unlocking position. Once the movable member 60 is moved a distance where the legs 62 no longer straddle (i.e., pass beyond) the end 36 of the second coupling member 32, the second coupling member 32 may be rotated relative to the first coupling assembly 31 (e.g., the sleeve 50) to align the end 36 with the first bore 52 in the sleeve 50. Once the end 36 and the first bore 52 are aligned, the second coupling member 32 may be removed (e.g., decoupled) from the first coupling assembly 31.

FIGS. 26 and 27 illustrate another exemplary embodiment of a release for the connector assembly 130 to allow the second coupling member 132 to be decoupled from the first coupling assembly 131. The release may be configured as described above, except the sleeve 50 and second coupling member 32 may each have two aligned openings 152*d*, where each aligned opening 152*d* allows access to one of the two legs 162 of the movable member 160, whereby an object (e.g., a tool) may be inserted into one or both of the aligned openings in the release direction RD to thereby move (e.g., slide) the movable member 160 out of the locking position with the second coupling member 132 to allow the second coupling member 132 to be decoupled from the first coupling assembly 131. Each opening 152*d* may be configured as a groove that extends through the first bore 152. As shown in FIGS. 19 and 19B, the second coupling member 132 may include a shoulder 135*a* that includes two notches, where each notch in the shoulder 135*a* may be aligned with one opening 152*d* to provide additional access for releasing the connected coupling members.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., movable, removable, or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat belt-to-pretensioner connector assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method of steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seat belt system for protecting an occupant of a vehicle comprising:
   a webbing configured to restrain the occupant;
   a pretensioner coupled to the webbing and configured to apply a tensile force to the webbing when a dynamic vehicle event is detected; and
   a connector assembly for connecting the webbing to the pretensioner, the connector assembly including a first coupling member having a first end and a second end connected to the webbing, and a second coupling member having a first end and a second end connected to the pretensioner, the first end of the second coupling member is configured to be detachably coupled to the first end of the first coupling member;

wherein the first end of the first coupling member includes a cavity configured to receive the first end of the second coupling member; and wherein the relative positions of the first and second coupling members are fixed when the first end of the second coupling member is inserted into the cavity and rotated relative to the first coupling member into a locked position.

2. The seat belt system of claim 1, wherein the connector assembly also includes a movable member disposed in the cavity and configured to move longitudinally therein between an unlocking position and a locking position.

3. The seat belt system of claim 2, wherein when the first end of the second coupling member is inserted into the cavity, the first end of the second coupling member moves the movable member to the unlocking position.

4. The seat belt system of claim 3, wherein the movable member moves to the locking position to the selectively lock the first end of the second coupling member in the cavity upon a relative rotation between the first and second coupling members.

5. The seat belt system of claim 2, wherein the connector assembly also includes a biasing member disposed in the cavity and configured to bias the moveable member toward the first end of the first coupling member.

6. The seat belt system of claim 1, wherein the first end of the first coupling member is a sleeve and the second end of the first coupling member is a ring member.

7. The seat belt system of claim 6, wherein the sleeve and the ring member are formed separately and coupled together.

8. The seat belt system of claim 7, wherein the sleeve and the ring member are coupled together through one of a threaded connection and a retaining ring that engages a first groove in an inner wall of the ring member and a second groove in an outer wall of the sleeve.

9. The seat belt system of claim 1, wherein the first end of the first coupling member has an opening having a key-way shape configured to receive the first end of the second coupling member having a mating key-way shape.

10. The seat belt system of claim 2, wherein an inner wall of the first coupling member defining the cavity includes a groove that is configured to receive a finger of the movable member to maintain an alignment between a sleeve and the movable member.

11. A connector assembly for connecting a pretensioner to a seat belt, comprising:
    a first coupling member having a cavity, an opening to provide access to the cavity, and a lug that is provided adjacent to the opening to define a key-way shape opening;
    a second coupling member having an end configured to selectively engage the cavity through the key-way shaped opening to detachably connect the first and second coupling members; and
    a movable member including a leg and a base configured to move in a longitudinal direction within the cavity;
    wherein the end of the second coupling member moves the movable member to an unlocking position when inserted into the cavity;
    wherein a relative rotation between the first and second coupling members allows the movable member to move to a locking position in which the leg engages the key-way shaped opening to detachably connect the first and second coupling members; and
    wherein the lug limits movement of the movable member and engages the end to fix the relative positions of the first and second coupling members when the end of the second coupling member is inserted into the cavity and rotated relative to the first coupling member into a locked position.

12. The connector assembly of claim 11, wherein one of the first coupling member and the second coupling member is configured to be coupled to the seat belt, and the other of the first coupling member and the second coupling member is configured to be coupled to the pretensioner.

13. The connector assembly of claim 11, further comprising a biasing member disposed in the cavity and configured to bias the moveable member in the longitudinal direction.

14. The connector assembly of claim 11, wherein the movable member includes two spaced-apart legs configured to engage the key-way shaped opening in the locking position.

15. An occupant restraint system for securing an occupant of a vehicle, comprising:
    a seat belt configured to restrain the occupant;
    a pretensioner configured to apply a force to the seat belt; and
    a connector assembly configured to detachably connect the pretensioner to the seat belt, the connector assembly comprising:
    a first coupling member having a cavity and an opening to provide access to the cavity, the opening having a different cross-sectional shape than the cavity; and
    a second coupling member having an end configured to selectively engage the cavity through the opening to detachably connect the first and second coupling members;
    wherein one of the first and second coupling members are coupled to the seat belt and the other of the first and second coupling members are coupled to the pretensioner;
    wherein the relative positions of the first and second coupling members are fixed when the end of the second coupling member is inserted into the cavity and rotated relative to the first coupling member into a locked position.

16. The occupant restraint system of claim 15, wherein the first coupling member includes a lug that engages the end of the second coupling member to fix the relative positions of the first and second coupling members.

17. The occupant restraint system of claim 15, wherein the connector assembly further comprises a movable member configured to move longitudinally in the cavity, wherein the end is configured to move the movable member to an unlocking position when inserted into the cavity, and wherein the relative rotation between the first and second coupling members is configured to allow the movable member to move to a locking position to detachably connect the first and second coupling members.

18. The occupant restraint system of claim 15, wherein one of the first and second coupling members includes an integrated buckle mechanism that is configured to selectively connect to a tongue member.

* * * * *